United States Patent [19]
Pryor

[11] 4,398,789
[45] Aug. 16, 1983

[54] OPTO-ELECTRONICALLY CONTROLLED BATHING SYSTEMS

[75] Inventor: Timothy R. Pryor, Tecumseh, Canada

[73] Assignee: Diffracto Ltd., Windsor, Canada

[21] Appl. No.: 132,150

[22] Filed: Mar. 20, 1980

Related U.S. Application Data

[63] Continuation-in-part of Ser. No. 29,840, Apr. 13, 1979, abandoned.

[51] Int. Cl.³ .................................................. G02B 5/14
[52] U.S. Cl. ............................. 350/96.10; 350/96.15; 350/96.20
[58] Field of Search .............. 350/96.10, 96.15, 96.18, 350/96.19, 96.20, 96.23, 96.21

[56] References Cited

U.S. PATENT DOCUMENTS

| | | | |
|---|---|---|---|
| 3,498,286 | 3/1970 | Polanyi et al. | 350/96.23 X |
| 3,886,544 | 5/1975 | Narodny | 350/96.15 X |
| 3,910,678 | 10/1975 | McCartney et al. | 350/96.21 |
| 3,937,952 | 2/1976 | Ripley et al. | 350/96.2 X |
| 4,274,705 | 6/1981 | Miller | 350/96.15 |

FOREIGN PATENT DOCUMENTS

636803 12/1978 U.S.S.R. .......................... 350/96.2

OTHER PUBLICATIONS

Uberbacher, "Fiber Optic Illuminated Switch," *IBM Tech. Discl. Bulletin*, vol. 18, No. 2, Jul. 1975, p. 483.

*Primary Examiner*—John D. Lee
*Attorney, Agent, or Firm*—Larson and Taylor

[57] ABSTRACT

Bathing systems with electronic and optionally microcomputer control of optionally multiple functions, user safety being assured by fibre-optic remoting techniques. Systems include electrically safe optical control means to be positioned in or proximate to the bathing location, this location being a swimming pool, bathtub, whirlpool bath, shower, bidet, or similar installation. These systems also include such valves, pumps, pulsation-causing devices, water conditioning devices, and the like, as may be required by any of the multiple functions that may be desired, all of these devices being under the control of a single electronic controller responsive to the optical control means at the bathing location, and also responsive to various water condition sensors.

The optical control means includes a light altering mechanism, preferably an optical touch switch such as might be operated by light reflected from the user's finger, this mechanism being connected by fibre optic tube means to a remote light source and detector; it may also include a display means such as optical fibres or fibre bundles carrying light from remote light sources indicating water or other conditions known by the electronic controller. The electronic controller preferably includes a microcomputer because of the ease with which microcomputers can handle many input variables and many possible output functions, for the optimization of both comfort and efficiency of the bathing installations.

For simplicity of installation, fibre optic tube means are preferably incorporated into the water-carrying plastic pipe.

10 Claims, 4 Drawing Figures

OPTO-ELECTRONICALLY CONTROLLED BATHING SYSTEMS

This application is a Continuation-In-Part to U.S. Application Ser. No. 29,840, filed Apr. 13, 1979, entitled *Optically Controlled Plumbing Apparatus*, now abandoned.

FIELD OF THE INVENTION

This invention seeks to provide a more controllable, enjoyable and energy efficient water system for whirlpools, swimming pools, bidets, showers and other human usable water systems. By use of fibre optic sensing and control signals, a totally safe means is provided to input information to a water controller for the hot/cold water flow and mixing, pump motors, orifice selector valves, and auxiliary heating elements.

Incorporation of a microcomputer into the controller, allows programmed regimes of operation to be undertaken which are impossible with conventional control systems for such water based systems. Even without the computer, considerable benefit is derived by simply having the controls of the tub, etc., safely located where the user can reach them while in the tub, pool, etc. With conventional electrical controls, most all building codes require location of same at a distance so as to be inaccessable to those using the tub. This is hardly convenient, if, once in, one would like to alter the pressure, etc.

With the incorporation of the microcomputer, however, much greater flexibility is possible, so that totally new concepts in bathing can be applied. For example, in a whirlpool bath it becomes possible to turn individual jets on or off, or vary their power output with time, using the microcomputer's built in clock. With some further hardware, such features as pulsation, individual temperature control at each jet, automatic mixing of bath and bubble bath, etc., can be added. Since all these functions are under microcomputer control, programmed regimes of operation involving variable flows, different flow directions, flow reversals, temperature gradients, and the like, are all possible. As a further example, a new kind of shower becomes possible, with jets squirting water from different heights and angles for specified times with specified conditions under the control of the system. These features are also applicable in a bidet: for douche, for foot cleaning, or for anything else as required. As a last example, microcomputer control in the swimming pool area would afford such features as automatic control of temperature, discharge pressure, rate of flow, back pressure, in-line chlorine concentration, PH, etc., as well as varying temperature, heating, and flow with time of day and usage so as to minimize heat energy wastage and the like.

A further advantage of microcomputer control, as applied to a number of bathing or other installations, will be the coordination of hot water allocation among these, together with coordination of water heating, whether by tank or in-line electric coil heater, so as to maximize energy savings and user satisfaction. It is an object of the present invention to provide bathing systems which are electrically safe due to the use of fibre optic remoting techniques, and which can be safe in regard to the danger of scalding by reason of temperature control, and which have a whole new range of flexibility of functions by reason of the inclusion of an electronic controller, preferably including a microcomputer.

BRIEF SUMMARY OF THE INVENTION

The foregoing and other objects which will be apparent to those having ordinary skill in the art are achieved in accordance with the present invention by:

(a) providing an electronic controller, preferably to include a microcomputer for managing the various conditions and functions that may be required for the bathing system, and suitable I/O hardware;

(b) providing electrically safe fibre-optic switches and displays located in or proximate to the bathing installation or installations for convenience of control by the user, where said switches are preferably touch switches, preferably operated by light reflected from the user's finger, and where said displays utilize light from remote light sources so as to indicate to the user whatever conditions, such as temperature or pressure of water, are required. The light sources and detectors connected by optical fibres to said switches and said displays preferably utilize a clock function within the said electronic controller, so that a very few switches and displays can control many functions, by repeated, shorter, longer, or otherwise varied optical switch closures. Said switches and said displays preferably form flush type panel or panels in a sidewall of the bathing installation or enclosure, said panel or panels preferably being cast into and as part of, said enclosure whenever design considerations and all-plastic construction makes this possible.

(c) providing sensors for various water condition variables such as temperature, flow, pressure, PH, level, etc., these sensors preferably being fibre optic where possible, and suitable interfacing to the electronic controller.

(d) providing suitable valves, actuators, pumps, conduits, jets, pulsation-producing devices, mixing devices, on-line heaters, and the like, such as may be required by a particular bathing system or systems, and appropriate interfacing to the said electronic controller.

The invention described above is a comprehensive system for controlling the water condition in pools, whirlpools, etc. It has the tremendous advantage that it allows the user of the unit to actually vary the conditions while he is in that unit which is simply not possible under most codes with electrically controlled apparatus. This leads to increased enjoyment and could even provide a safety benefit if he would tend to do something stupid like trying to turn a switch off with a pole while sitting in the tub.

In the case of the swimming pools particularly, there is an advantage in energy conservation which might be obtained since it would keep the total control on the temperature of the pool and would not allow overheating to occur which either uses more energy or more chlorine, or both. It also can provide for automatic chlorination and Ph matching through the same microcomputer. It should be noted for example, that the microcomputer system as in the preceding copending case, can be one and the same for all the different pieces of apparatus. Thus, it can control the swimming pool, the whirlpool, plus all the other appliances in the house from one and the same control system. In the context of the swimming pool, this could mean that some savings results since the control system is there anyway. The saving really isn't the microcomputer per se, since they are getting cheaper daily, but in the valving, etc., that might be made common between the various border facilities, plus any heating and other mixing of the water, etc.

The invention will be further understood with reference to the following detailed description, which includes a description of embodiments illustrated in the drawings in which.

DETAILED DESCRIPTION

Figure 1:
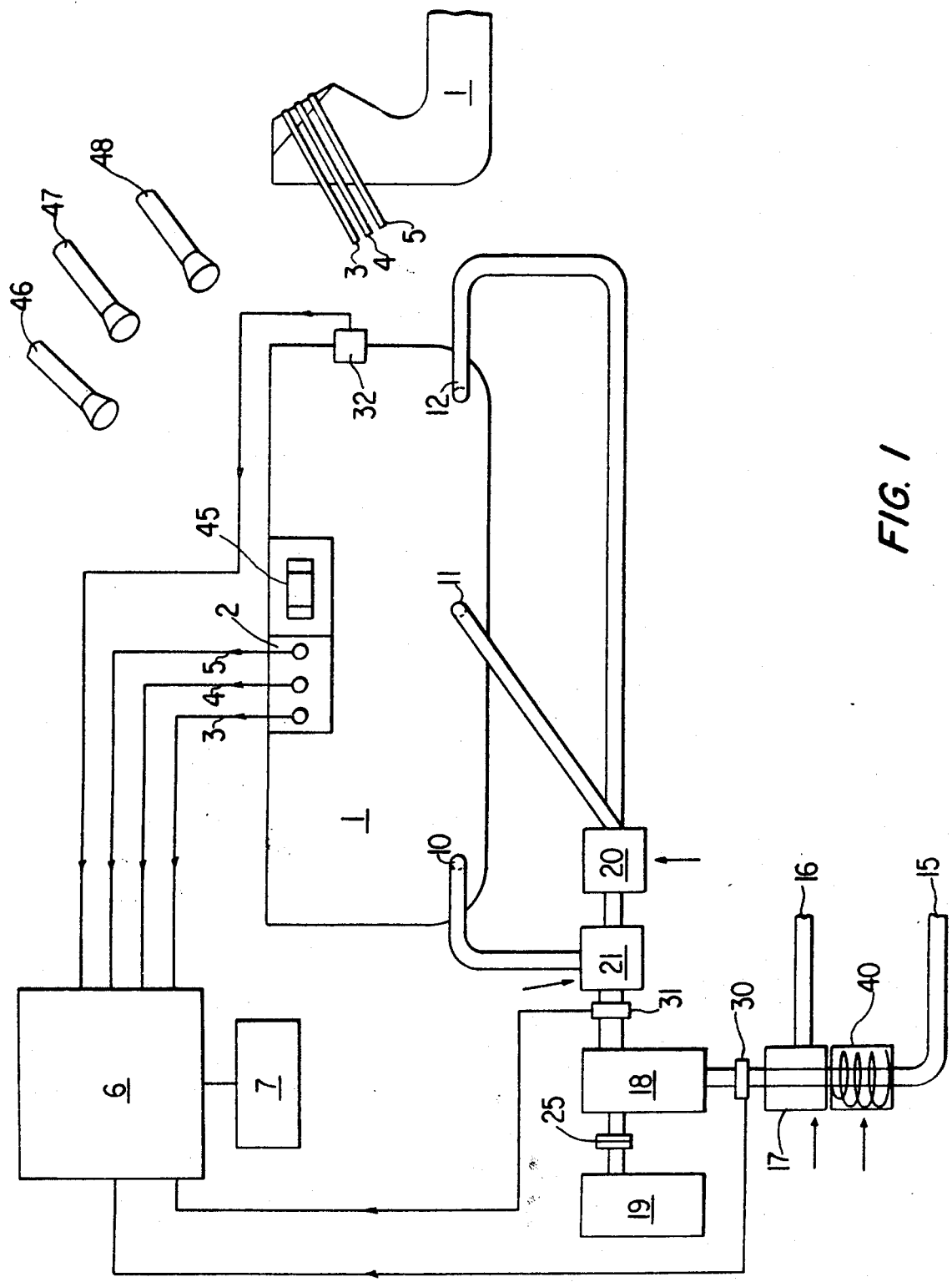
FIG. 1 is a possible embodiment of the opto-electronically controlled bathing system as applied to a combination whirlpool bath and advanced shower.

With reference to FIG. 1, a possible embodiment of the opto-electronically controlled bathing system is illustrated as applied to a multi-function shower and whirlpool bath installation. The system as shown, comprises the whirlpool tub 1 with control panel 2, connected by fibre optic cable means 3, 4, 5 to controller 6 with optional microcomputer 7, for the coordination of the remaining parts of the system 10-48. The bath is fed by jets 10,11,12; there could be more or fewer than three of these.

Incoming hot water in line 15 is mixed with cold water in line 16 by valve 17 and delivered to pump 18, driven by motor 19 and routed to jets 10-12 by the use selection valves 20 and 21. With the motor off, water comes in at line pressure, as in an ordinary tube except that the valves function at the direction of the controller. After the tub is full, or during filling, the motor can come on to circulate water. Since return means for this circulation would be more or less conventional, these have been omitted from the present figure, but would of course, be included in the system. An optional pulsator 25 can be used to give high pressure bursts.

Temperature, pressure and level are monitored by sensors 30, 31 and 32, the signals so generated being fed to the controller.

If insufficient hot water is available, optional heating unit 40 (for example, an electric coil or hot/water via heat exchanger with conventional furnace or solar heat) is utilized to bring the water to temperature.

An optional display 45 provides time, temperature or pressure information to the bather. This display can be remoted via fibres or provided electrically using low voltage LEDs.

The concepts here can also be applied to controlled multi jet shower baths, for example, with aerial jets 46, 47, 48 instead of 10, 11, 12. It further is clear that control of a swimming pool is also possible according to the invention as shown, where further functions can be added to sense PH and chlorine concentration and add appropriate chemicals accordingly. Level sensor 32 could in this case, be used to sense level and either drain or add water accordingly. Pressure gauge 31 can sense the back pressure in a filter interposed before valve 21, with signals so generated being used to govern the back flush cycles of said filter.

Figure 2:
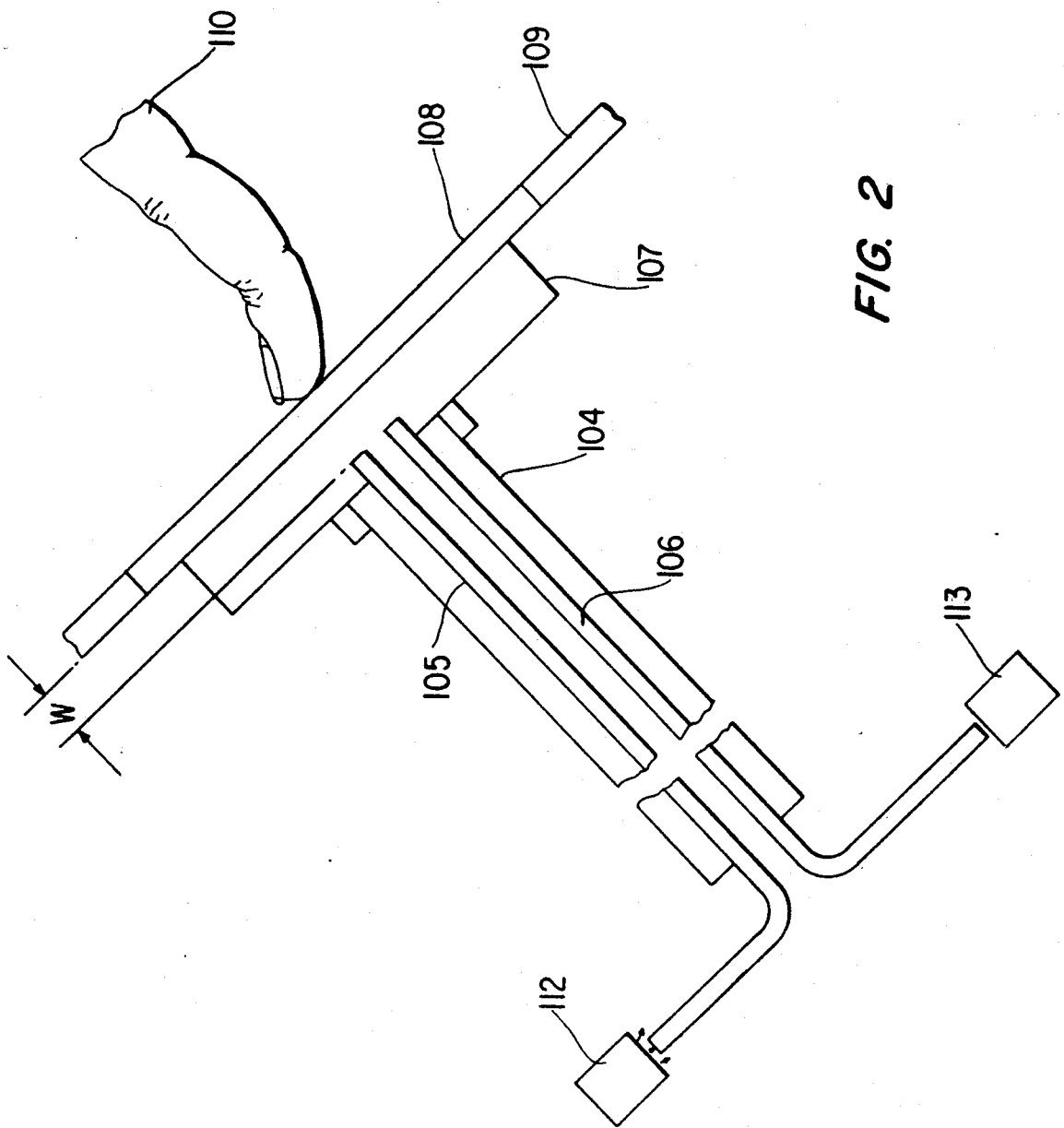
FIG. 2 is a possible embodiment of the said fibre-optic touch switch.

Switching and sensor commands can be input to the controller by any of the fibre based devices shown in my previous application. Shown in FIG. 2, is a new "touch" type flush mount version, to allow minimum cost of manufacture of the switch control which is actually part of the plastic tub side.

Fibre bundle 104, containing at a minimum, fibres 105 and 106, is inserted in receptacle 107, affixed to the back of transport section 108 of tub wall 109. This transparentness can actually be plastic opaque to the eye if an infrared light source such as GaAs LED 112 is used.

The distance w of the fibre 105 end to the wall, and the angle of the fibre to the wall and the separation distance of 106 from fibre 105, can all be chosen such that a minimum value $V_o$ of light is normally returned to detector 113.

When a finger such as 110 is placed on the tub wall in the switch zone, the finger tip causes light from 105 to be scattered into fibre 106 and a detected signal is produced suitable for controller 6.

In practice, the switch can be designed such that the minimum value $V_o$ is significantly greater than zero, so that it can be constantly monitored to assure light source and detector function.

In a typical installation, the user could have, as shown in FIG. 1, access to three switches of this type, e.g. one for on/off and jet select, one for temperature and pressure or flow rate, and one for other functions. To initiate operation, he could energize the on/off switch with one touch, and then when on, touch for three short touches. This would indicate that all three jets are required. At this point, the tub would fill until the present level was reached at the preset temperature.

A touch of the pressure button, and the pressure would rise slowly as long as the switch was continuously touched. A short touch and a continued long one could be used to initiate a reversal of flow, temperature change, or other modification of bathing conditions.

Thus, using the microcomputer and its clocking ability, three simple touch switches can be used to control multiple functions.

With reference to the manufacture of the bathing installation and the controlling fibre optic console, it will be preferable to cast these as a single unit where possible, for aesthetic reasons, to obviate any possibility of cracks around the console, and to reduce production costs. The control console, including fibre optic touch switches, can then be most easily made flush with the wall or side of the bathing installation or enclosure.

Figure 3:
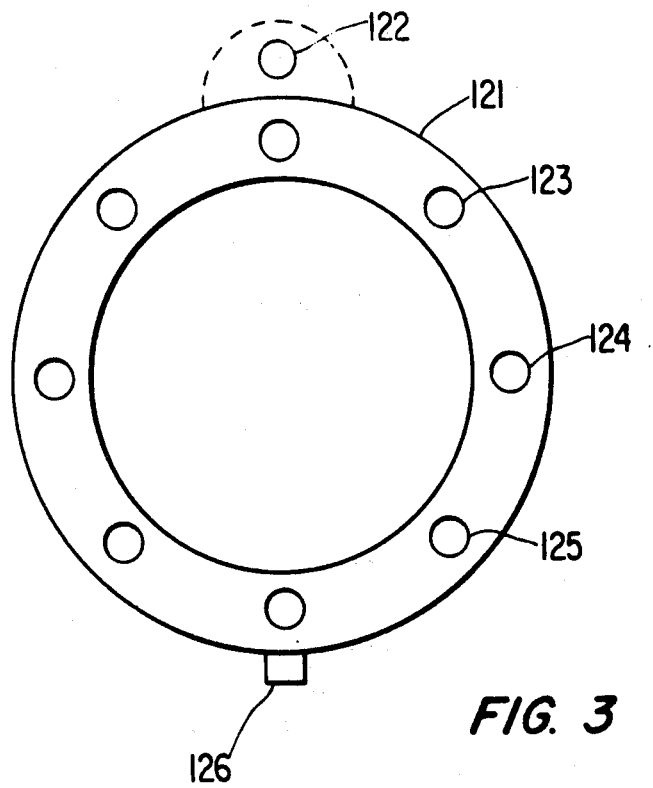
FIG. 3 represents a possible placing of fibre optic tube means within the wall of a plastic pipe, to simplify installation of the said invention.
Figure 4:
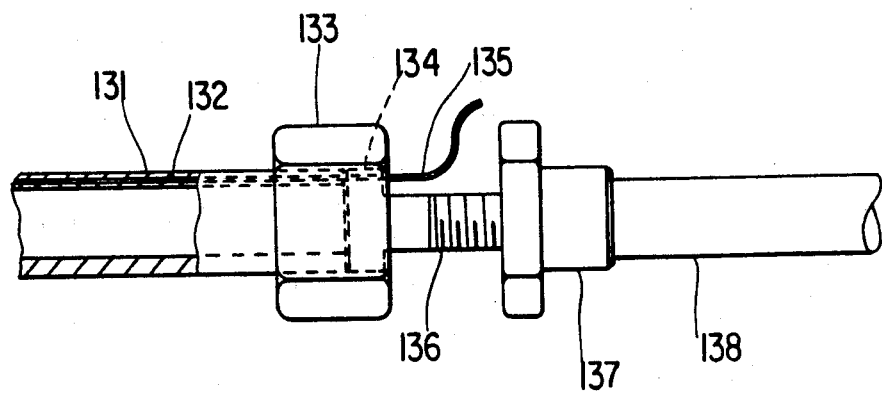
FIG. 4 represents a possible termination for such a water and light-carrying plastic pipe.

With reference to the installation of complete bathing systems, this will be greatly simplified if a single conduit carries both water and optical signals. FIG. 3 illustrates one possible such conduit. Typical fibre optic tube means 123, 124, and 125 are embedded in the wall of a plastic pipe 121 suitable for carrying a liquid such as water. It is also possible that fibre optic tube means such as 122 may be incorporated into a ridge along the outside of the pipe. A key 126 may also be incorporated for proper alignment of the fibres at the pipe ends. With reference to FIG. 4, a possible termination for such a pipe is shown. Pipe 131 including typical optical fibre 132, is joined by connector 133 to termination device 134, which allows the light conduit, as typified by optical fibre 135, to diverge from the water conduit 138. The water conduit 138 is joined to the termination device 134 having male thread 136 by connector 137.

What is claimed is:

1. In a method of installing plumbing in which a plurality of sections of water conduits are interconnected, the improvement wherein said water conduit comprises a plurality of sections each of which is provided with a fiber optic element extending along the full length of the pipe section along the wall thereof, and wherein, before adjacent sections of conduit are interconnected, a fiber optic element of one conduit section is aligned with a fiber optic element of an adjacent conduit section such that light conveyed through a fiber optic element in one conduit section is conveyed through the fiber optic element in an adjacent conduit section.

2. A method according to claim 1 wherein said conduit section comprises water pipe.

3. A plurality of water conduit sections, said sections being secureable together end to end to form a water conduit, each section comprising
- a section wall having a bore completely therethrough;
- at least one fiber optic element extending along the full length of said wall;
- means for securing each section end to end to an adjacent section;
- and means for aligning said fiber optic elements of adjacent conduit sections such that, when the conduit sections are secured together end to end, light conveyed through the fiber optic element in a conduit section will be conveyed through the aligned fiber optic element in a further conduit section secured to said one conduit section.

4. Conduit sections according to claim 3 wherein said sections comprise water pipe.

5. Conduit sections according to claim 3 wherein said conduit sections are fabricated of plastic and wherein said fiber optic elements are imbedded in the pipe walls.

6. Conduit sections according to claim 3 wherein said conduit sections are fabricated of metal and wherein said fiber optic elements are encased in protective material secured to the outer pipe wall.

7. Conduit sections according to claim 3 wherein said conduit sections are provided with means for securing each section end to end to an adjacent section.

8. Conduit sections according to claim 7 wherein said section securing means comprises a threaded coupling.

9. Conduit sections according to claim 7 wherein said section securing means comprises a breech block cam action coupling.

10. Conduit sections according to claim 3 wherein said aligning means comprises a key and keyway.

* * * * *